US012199376B2

(12) United States Patent
Yao et al.

(10) Patent No.: US 12,199,376 B2
(45) Date of Patent: Jan. 14, 2025

(54) ELECTRICAL CONNECTOR WITH HYBRID CONNECTION FOR CONDUCTIVE TERMINALS

(71) Applicant: DONGGUAN LUXSHARE TECHNOLOGIES CO., LTD, Dongguan (CN)

(72) Inventors: Kunlin Yao, Dongguan (CN); Rongzhe Guo, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 302 days.

(21) Appl. No.: 17/949,281

(22) Filed: Sep. 21, 2022

(65) Prior Publication Data

US 2023/0187876 A1 Jun. 15, 2023

(30) Foreign Application Priority Data

Dec. 14, 2021 (CN) ......................... 202111524642.8

(51) Int. Cl.

*H01R 13/627* (2006.01)
*H01R 12/51* (2011.01)

(Continued)

(52) U.S. Cl.

CPC ....... *H01R 13/6273* (2013.01); *H01R 12/515* (2013.01); *H01R 12/722* (2013.01);

(Continued)

(58) Field of Classification Search

CPC ................ H01R 12/515; H01R 12/722; H01R 13/6273; H01R 13/11; H01R 13/502; H01R 13/648; H01R 13/66; H01R 31/06

(Continued)

(56) References Cited

U.S. PATENT DOCUMENTS

2012/0129396 A1* 5/2012 Wang .................. H01R 12/721 439/620.24
2014/0187087 A1* 7/2014 Mason .............. H01R 13/6592 439/607.36

(Continued)

*Primary Examiner* — Gary F Paumen

(74) *Attorney, Agent, or Firm* — Birch, Stewart, Kolasch & Birch, LLP

(57) ABSTRACT

An electrical connector includes an insulating body, a number of first conductive terminals, a number of second conductive terminals, an adapter circuit board, and cables. The first conductive terminals include a number of first high-speed signal terminals and a number of first non-high-speed signal terminals. Each first high-speed signal terminal includes a first connecting portion. Each first non-high-speed signal terminal includes a first elastic mounting arm. The second conductive terminals include a number of second high-speed signal terminals and a number of second non-high-speed signal terminals. Each second high-speed signal terminal includes a second connecting portion. Each second non-high-speed signal terminal includes a second elastic mounting arm. The adapter circuit board is located between the first elastic mounting arms and the second elastic mounting arms. The cables include first cables electrically connected to the first connecting portions and second cables electrically connected to the second connecting portions.

20 Claims, 18 Drawing Sheets

(51) Int. Cl.

| | |
|---|---|
| ***H01R 12/72*** | (2011.01) |
| ***H01R 13/11*** | (2006.01) |
| ***H01R 13/502*** | (2006.01) |
| ***H01R 13/648*** | (2006.01) |
| ***H01R 13/66*** | (2006.01) |
| ***H01R 31/06*** | (2006.01) |

(52) U.S. Cl.
CPC ........... *H01R 13/11* (2013.01); *H01R 13/502* (2013.01); *H01R 13/648* (2013.01); *H01R 13/66* (2013.01); *H01R 31/06* (2013.01)

(58) Field of Classification Search
USPC ..................................................... 439/438, 79
See application file for complete search history.

(56) References Cited

U.S. PATENT DOCUMENTS

2019/0208621 A1* 7/2019 Lo .......................... H05K 1/181
2019/0312389 A1* 10/2019 Little ................. H01R 13/6594

* cited by examiner

ELECTRICAL CONNECTOR WITH HYBRID CONNECTION FOR CONDUCTIVE TERMINALS

CROSS-REFERENCE TO RELATED APPLICATION

This patent application claims priority of a Chinese Patent Application No. 202111524642.8, filed on Dec. 14, 2021 and titled "ELECTRICAL CONNECTOR", the entire content of which is incorporated herein by reference.

TECHNICAL FIELD

The present disclosure relates to an electrical connector, which belongs to a technical field of connectors.

BACKGROUND

With the continuous development of electrical connectors, the conductive terminals of the electrical connectors have more and more appearances. Some of the conductive terminals are used to transmit high-speed signals, and these conductive terminals are called high-speed signal terminals. Some conductive terminals are used to transmit non-high-speed signals, and these conductive terminals are called non-high-speed signal terminals.

In the related art, it is generally not distinguished whether the conductive terminals are high-speed signal terminals or non-high-speed signal terminals, and cable connection or circuit board connection is used uniformly. However, this approach still has room for improvement.

SUMMARY

An object of the present disclosure is to provide an electrical connector with a hybrid connection for conductive terminals.

In order to achieve the above object, the present disclosure adopts the following technical solution: an electrical connector, including: an insulating body, the insulating body including a mating surface and a receiving slot extending through the mating surface; a plurality of first conductive terminals, each first conductive terminal including a first elastic mating portion protruding into the receiving slot and a first tail portion opposite to the first elastic mating portion; the plurality of first conductive terminals including a plurality of first high-speed signal terminals and a plurality of first non-high-speed signal terminals, the first tail portion of each first high-speed signal terminal including a first connecting portion, the first tail portion of each first non-high-speed signal terminal including a first elastic mounting arm; a plurality of second conductive terminals, each second conductive terminal including a second elastic mating portion protruding into the receiving slot and a second tail portion opposite to the second elastic mating portion; the plurality of second conductive terminals including a plurality of second high-speed signal terminals and a plurality of second non-high-speed signal terminals, the second tail portion of each second high-speed signal terminal including a second connecting portion, the second tail portion of each second non-high-speed signal terminal including a second elastic mounting arm; wherein the first elastic mating portions of the first conductive terminals and the second elastic mating portions of the second conductive terminals are located on opposite sides of the receiving slot, respectively; an adapter circuit board, the adapter circuit board including a first surface, a second surface opposite to the first surface, a plurality of first conductive pads exposed on the first surface, and a plurality of second conductive pads exposed on the second surface; the adapter circuit board being located between the first elastic mounting arms and the second elastic mounting arms, the first elastic mounting arms being electrically connected to the first conductive pads, the second elastic mounting arms being electrically connected to the second conductive pads; a plurality of cables, the plurality of cables including a plurality of first cables electrically connected to the first connecting portions and a plurality of second cables electrically connected to the second connecting portions.

In order to achieve the above object, the present disclosure adopts the following technical solution: an electrical connector, including: an insulating body, the insulating body including a mating surface and a receiving slot extending through the mating surface; a plurality of first conductive terminals, each first conductive terminal including a first elastic mating portion and a first tail portion; the plurality of first conductive terminals including a plurality of first high-speed signal terminals and a plurality of first non-high-speed signal terminals, the first tail portion of each first high-speed signal terminal including a first connecting portion, the first tail portion of each first non-high-speed signal terminal including a first elastic mounting arm; a plurality of second conductive terminals, each second conductive terminal including a second elastic mating portion and a second tail portion; the plurality of second conductive terminals including a plurality of second high-speed signal terminals and a plurality of second non-high-speed signal terminals, the second tail portion of each second high-speed signal terminal including a second connecting portion, the second tail portion of each second non-high-speed signal terminal including a second elastic mounting arm; wherein the first elastic mating portions of the first conductive terminals and the second elastic mating portions of the second conductive terminals are located on opposite sides of the receiving slot, respectively; an adapter circuit board, the adapter circuit board including a first surface, a second surface opposite to the first surface, a plurality of first conductive pads exposed on the first surface, and a plurality of second conductive pads exposed on the second surface; the adapter circuit board being located between the first elastic mounting arms and the second elastic mounting arms, the first elastic mounting arms being soldered with the first conductive pads, the second elastic mounting arms being soldered with the second conductive pads; a plurality of cables, the plurality of cables including a plurality of first cables electrically connected to the first connecting portions and a plurality of second cables electrically connected to the second connecting portions.

Compared with the prior art, the first high-speed signal terminals and the second high-speed signal terminals of the present disclosure are connected to the first cables and the second cables, and are transmitted through the cables, which reduces distortion and improves the quality of signal transmission. At the same time, the first non-high-speed signal terminals and the second non-high-speed signal terminals are electrically connected to the adapter circuit board, which simplifies a circuit design of the adapter circuit board. The first conductive terminals and the second conductive terminals of the electrical connector of the present disclosure are connected by the cables and the adapter circuit board in a hybrid manner, which can not only adapt to the transmission of high-speed signal terminals and non-high-speed signal terminals, but also balance the design of the electrical connector and save costs.

DETAILED DESCRIPTION

Figure 1:
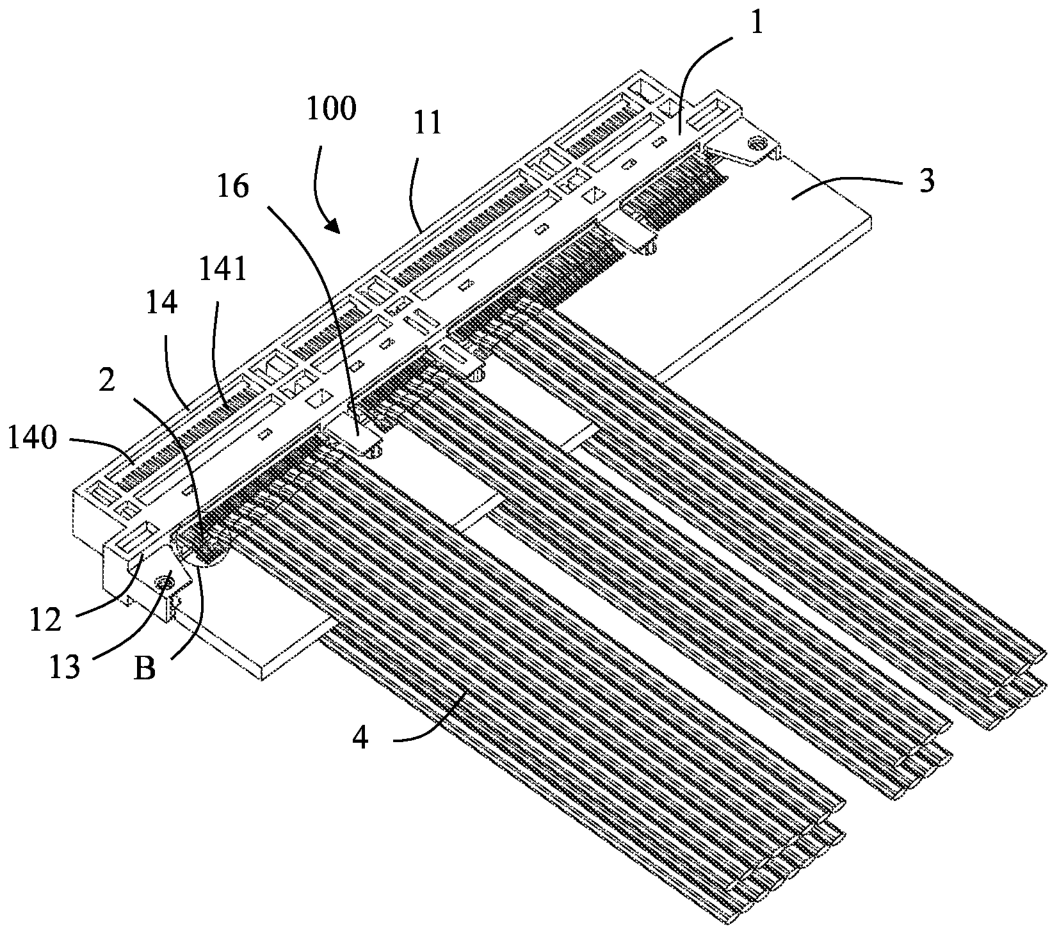
FIG. 1 is a perspective schematic view of an electrical connector in accordance with an embodiment of the present disclosure.
Figure 2:
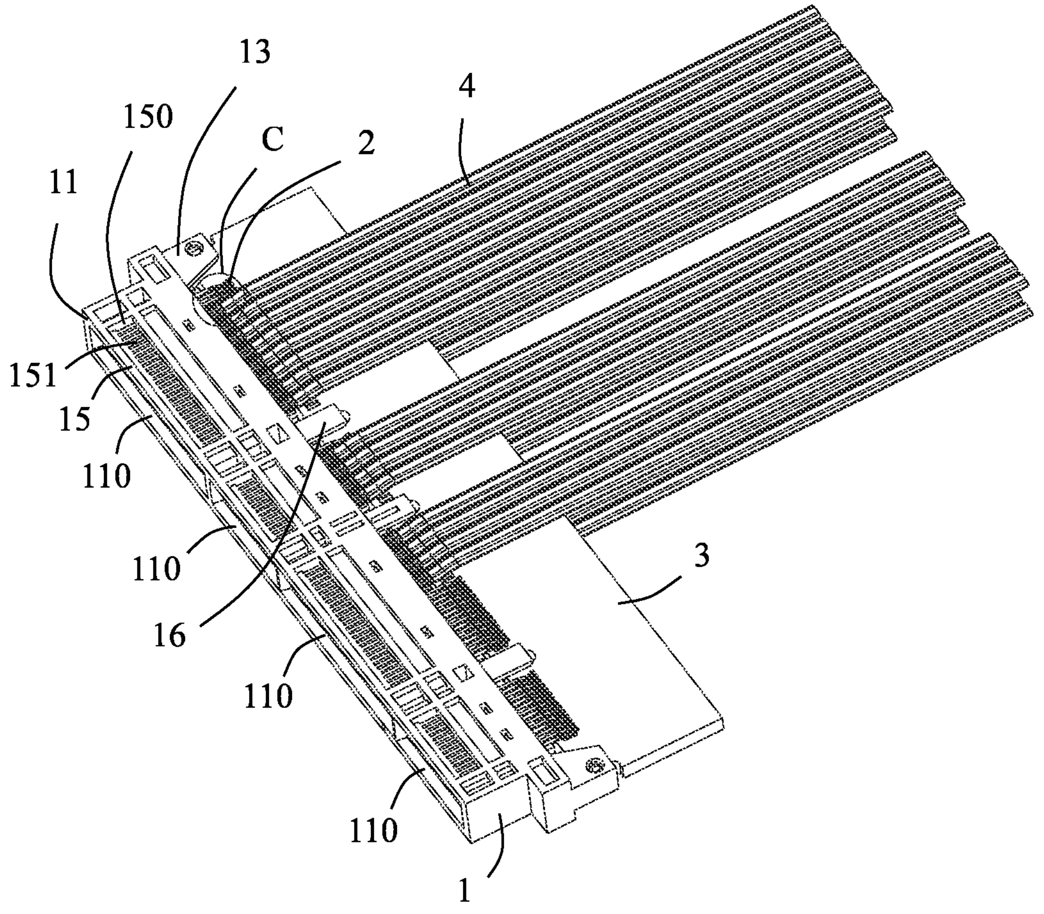
FIG. 2 is a perspective schematic view of FIG. 1 from another angle.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 18, the present disclosure discloses an electrical connector 100 including an insulating body 1, a plurality of conductive terminals 2, an adapter circuit board 3, and a plurality of cables 4. The electrical connector 100 is used for mating with a mating connector (not shown) to transmit data and connect to a power source etc.

Referring to FIGS. 1, 2, 5, 9 and 10, in the illustrated embodiment of the present disclosure, the insulating body 1 includes a mating surface 11, a rear end face 12 opposite to the mating face 11, a receiving slot 110 extending forwardly through the mating surface 11, and an extension portion 13 extending backwardly beyond the rear end surface 12. In the illustrated embodiment of the present disclosure, the mating surface 11 is a front end surface. A plurality of the receiving slots 110 are provided and arranged at intervals along a length direction L-L (for example, a left-right direction) of the electrical connector 100. In the illustrated embodiment of the present disclosure, sizes of two adjacent receiving slots 110 along the length direction L-L of the electrical connector 100 are different.

Since the structure of the electrical connector 100 corresponding to each receiving slot 110 is similar, only one of the receiving slots 110 will be described below as an example.

The insulating body 1 includes a top wall 14 and a bottom wall 15. The receiving slot 110 is located between the top wall 14 and the bottom wall 15. The top wall 14 includes a first hollow groove 140 and a plurality of first spacing grooves 141 connected to the first hollow groove 140. The bottom wall 15 includes a second hollow groove 150 and a plurality of second spacing grooves 151 connected to the second hollow groove 150.

Figure 9:
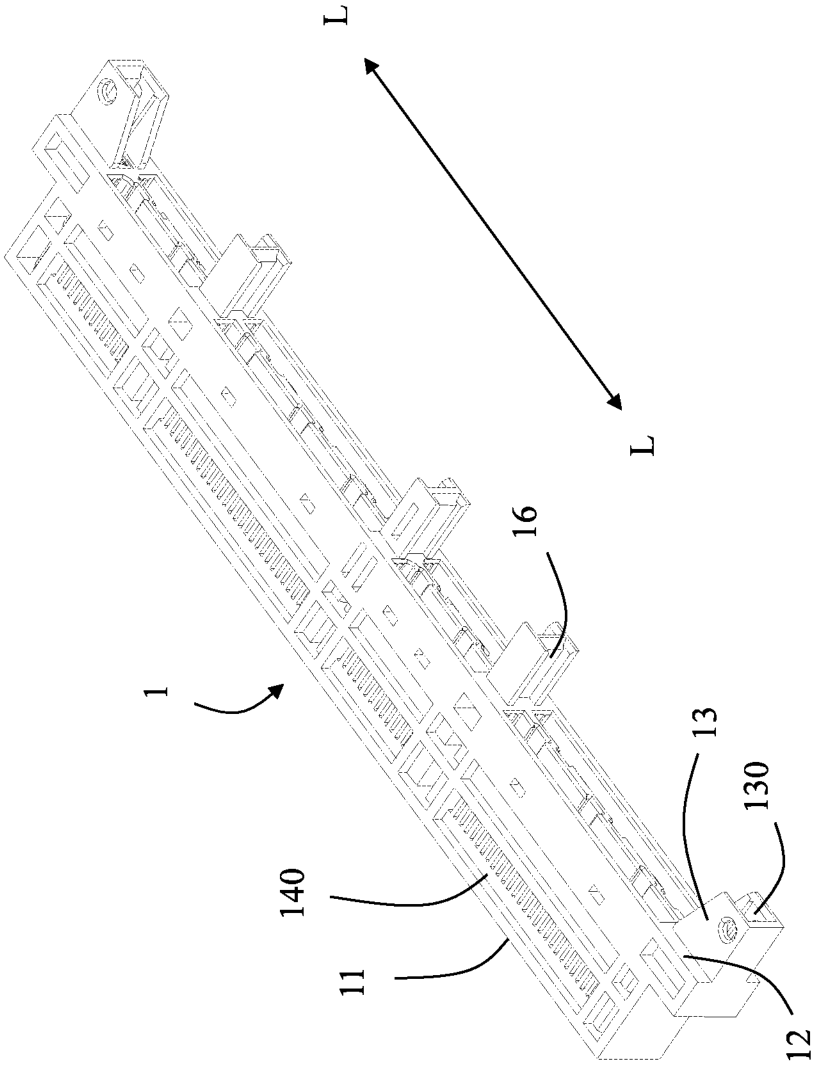
FIG. 9 is a perspective schematic view of an insulating body in FIG. 1.
Figure 10:
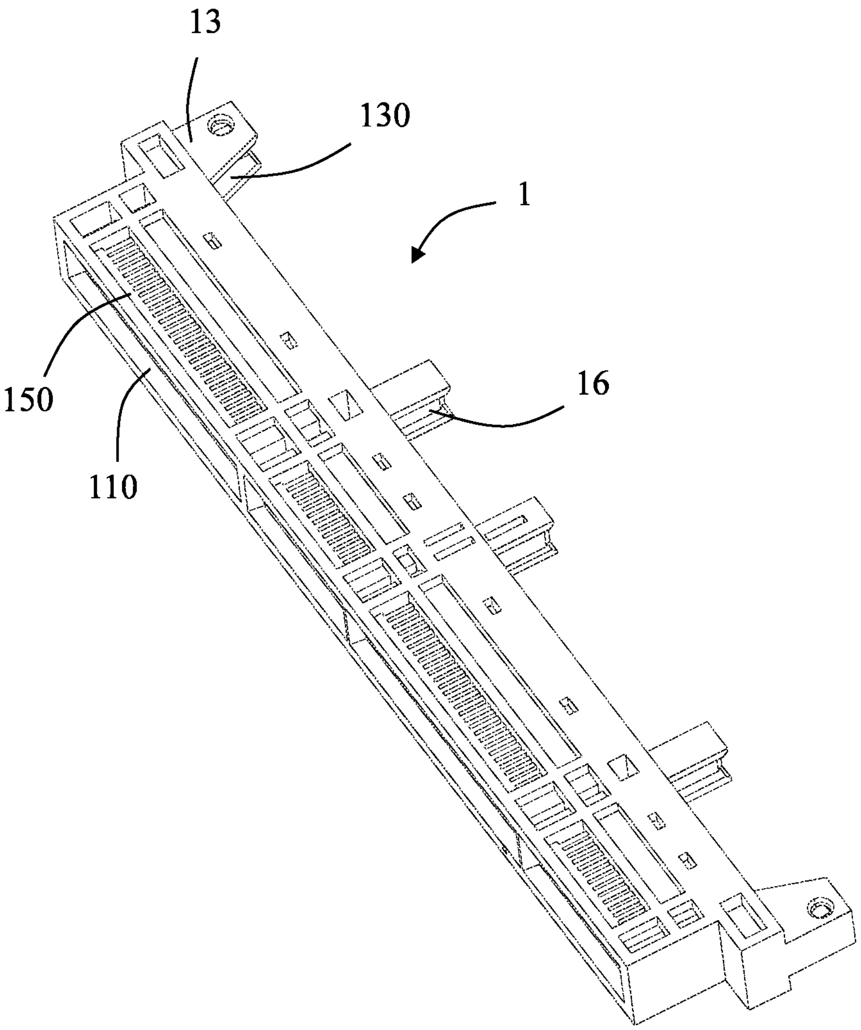
FIG. 10 is a perspective schematic view of FIG. 9 from another angle.

Referring to FIGS. 9 and 10, the extension portion 13 is provided with a positioning groove 130 for at least partially receiving the adapter circuit board 3. In addition, referring to FIGS. 6 and 7, in order to better position and fix the adapter circuit board 3, the extension portion 13 is provided with a first rib 131 protruding upwardly into the positioning groove 130 and a second rib 132 protruding downwardly into the positioning groove 130. The first rib 131 and the second rib 132 abut against opposite surfaces of the adapter circuit board 3, respectively.

Figure 3:
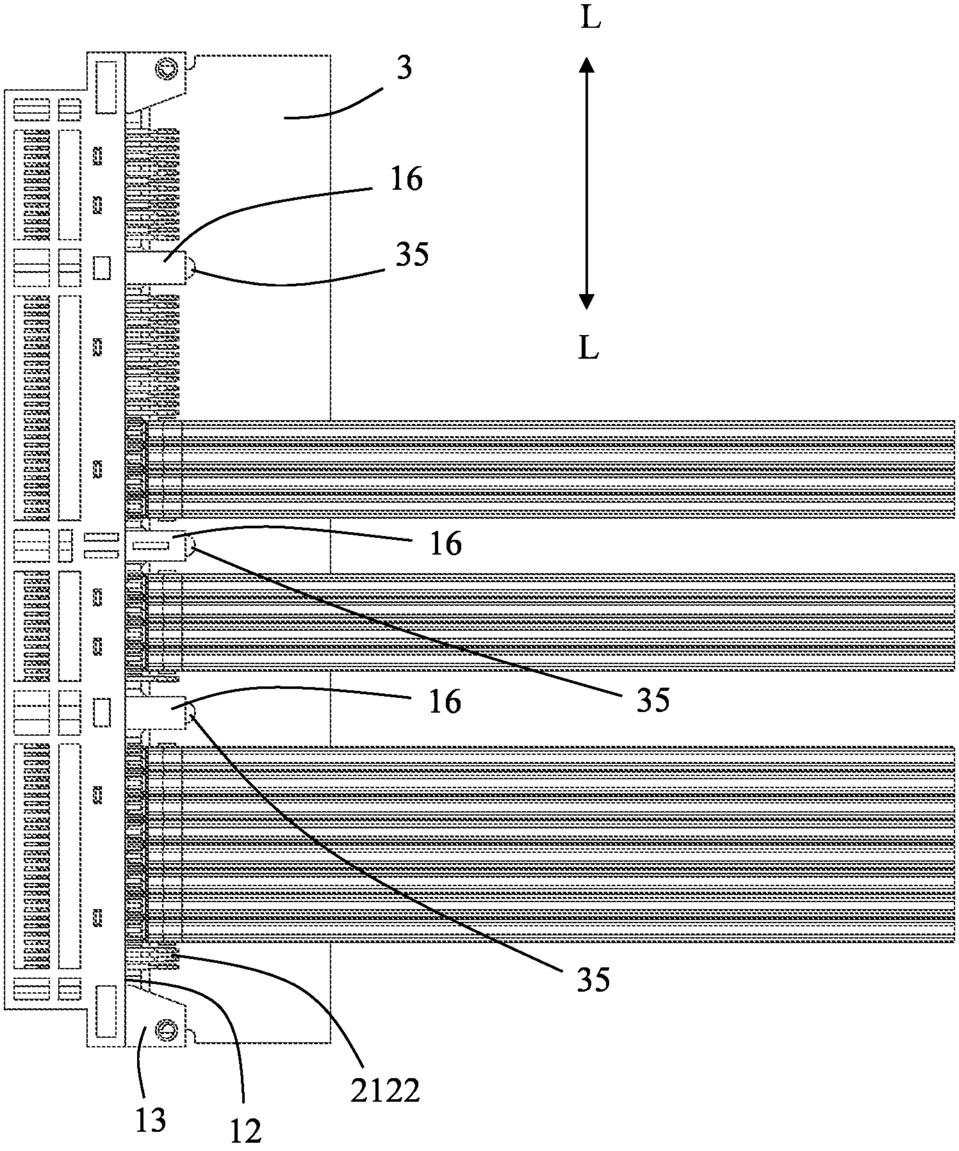
FIG. 3 is a top view of FIG. 1.
Figure 4:
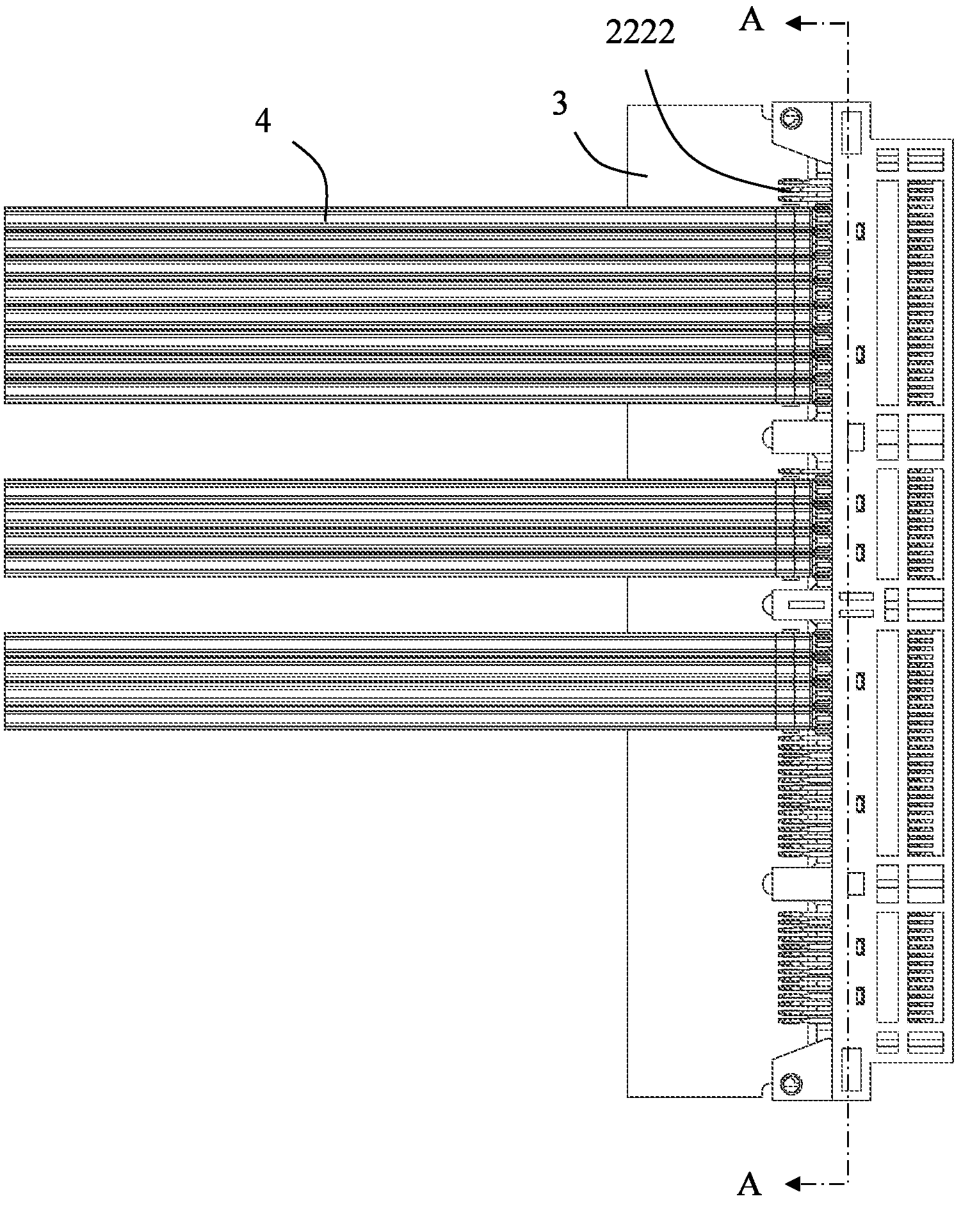
FIG. 4 is a bottom view of FIG. 3.
Figure 5:
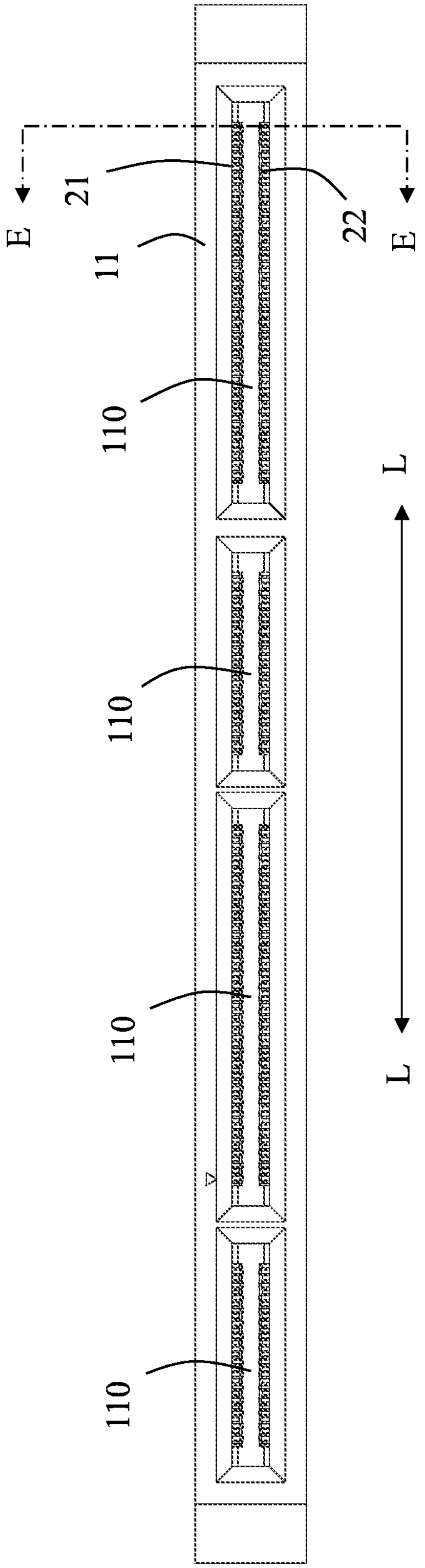
FIG. 5 is a front view of FIG. 1.
Figure 6:
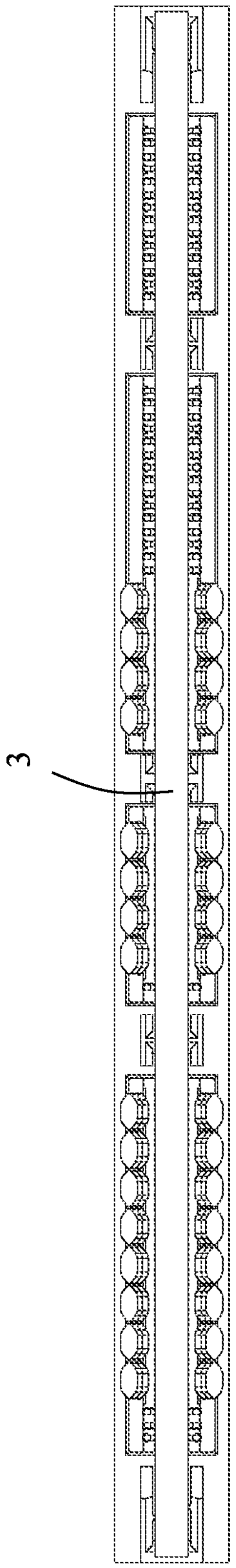
FIG. 6 is a rear view of FIG. 1.
Figure 7:
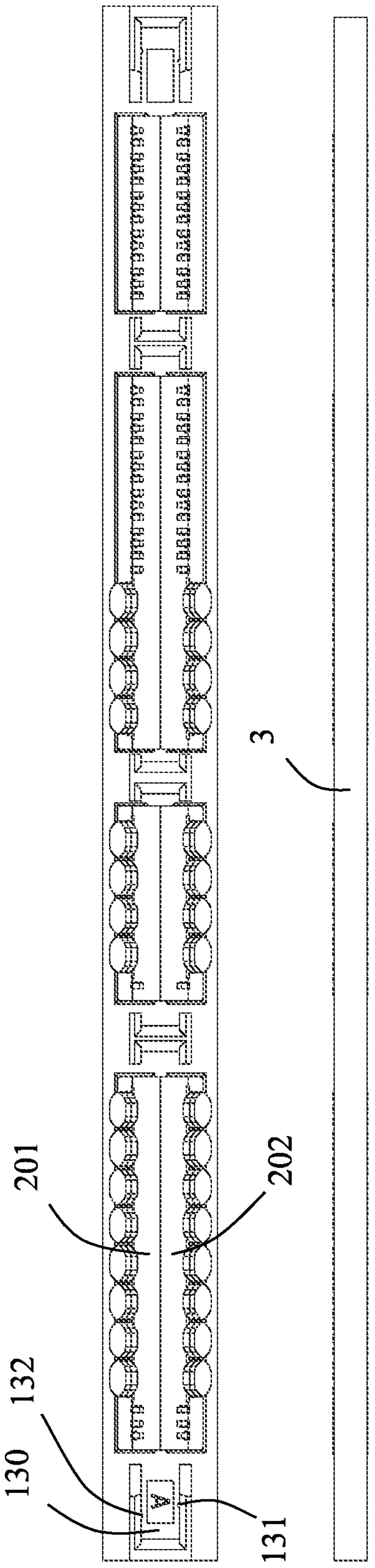
FIG. 7 is a partial exploded schematic view of FIG. 6.
Figure 8:
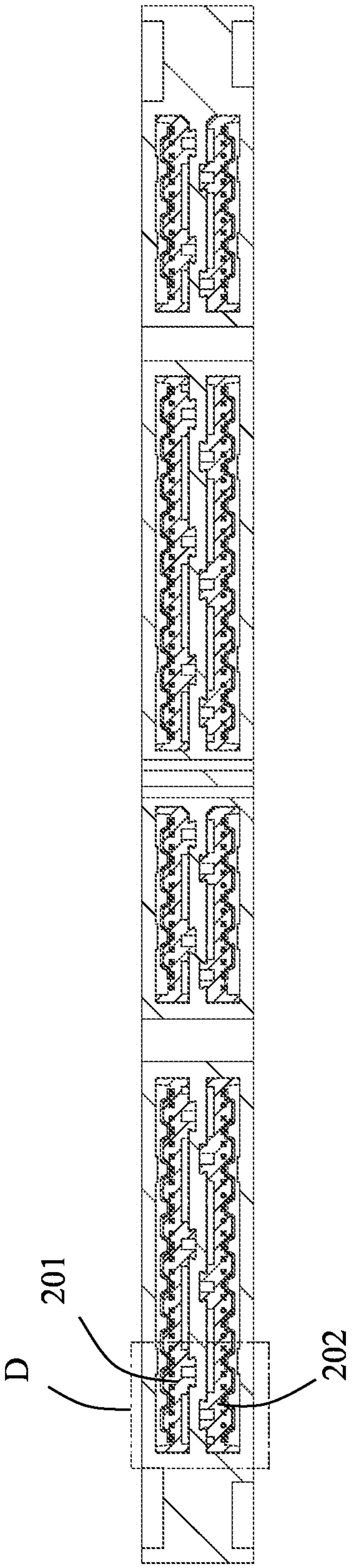
FIG. 8 is a schematic cross-sectional view taken along line A-A in FIG. 4.

Referring to FIG. 3, the insulating body 1 further includes a partition 16 located between two adjacent receiving slots 110 along the length direction L-L. The partition 16 protrudes backwardly beyond the rear end surface 12 to be matched with the adapter circuit board 3.

Referring to FIG. 5 and FIGS. 11 to 18, the plurality of conductive terminals 2 include a plurality of first conductive terminals 21 and a plurality of second conductive terminals 22. The plurality of first conductive terminals 21 are arranged in a row (for example, an upper row). The plurality of second conductive terminals 22 are arranged in another row (for example, a lower row).

In the illustrated embodiment of the present disclosure, the electrical connector 100 includes a first terminal module 201 and a second terminal module 202. The first terminal module 201 and the second terminal module 202 are assembled to the insulating body 1. The first terminal module 201 includes a first insulating block 23. The plurality of first conductive terminals 21 are insert-molded with the first insulating block 23. The second terminal module 202 includes a second insulating block 24. The plurality of second conductive terminals 22 are insert-molded with the second insulating block 24. Of course, in other embodiments, the first conductive terminals 21 and the second conductive terminals 22 may also be directly assembled to the insulating body 1.

Figure 13:
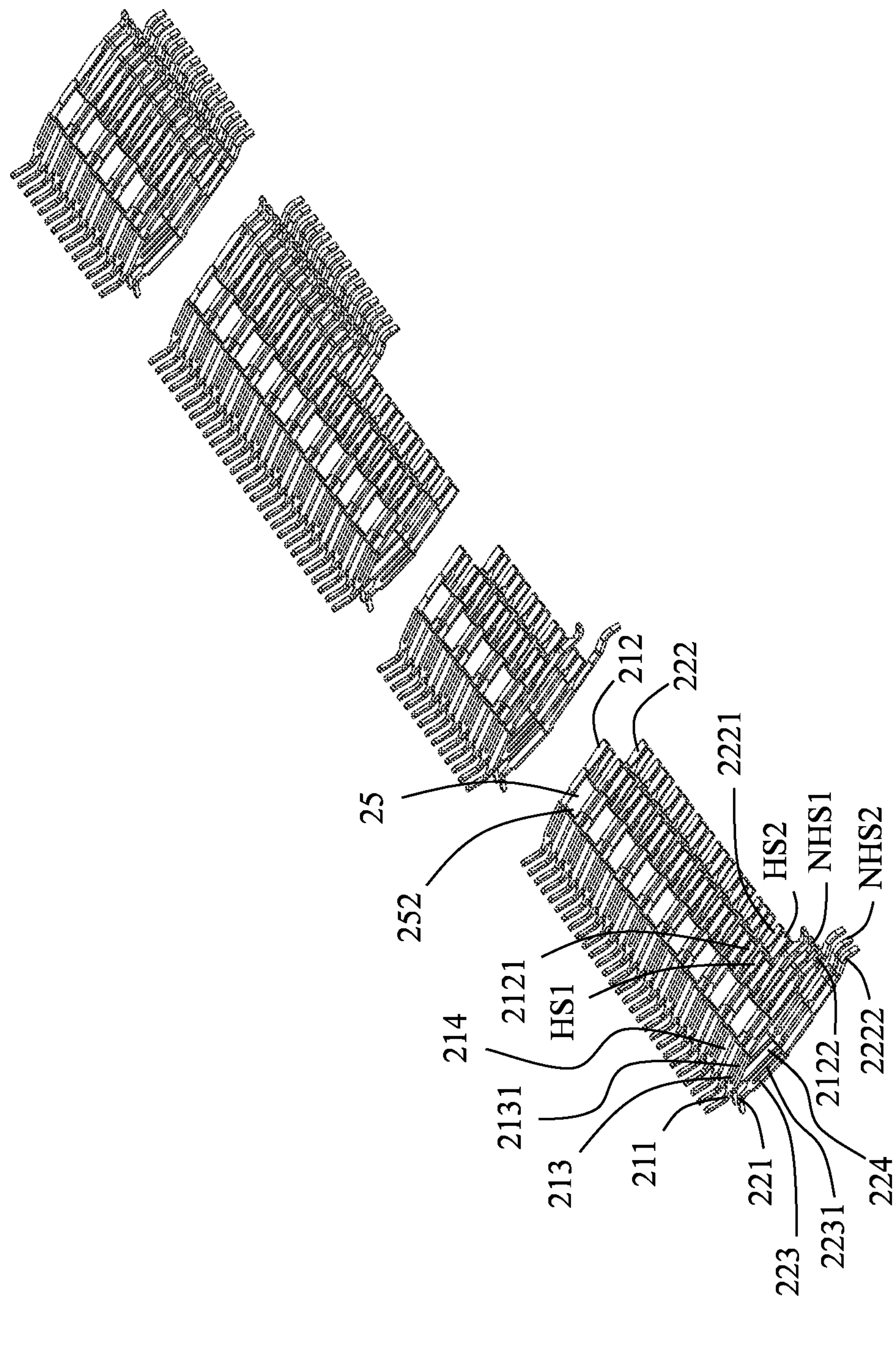
FIG. 13 is a perspective schematic view of conductive terminals in FIG. 11.
Figure 14:
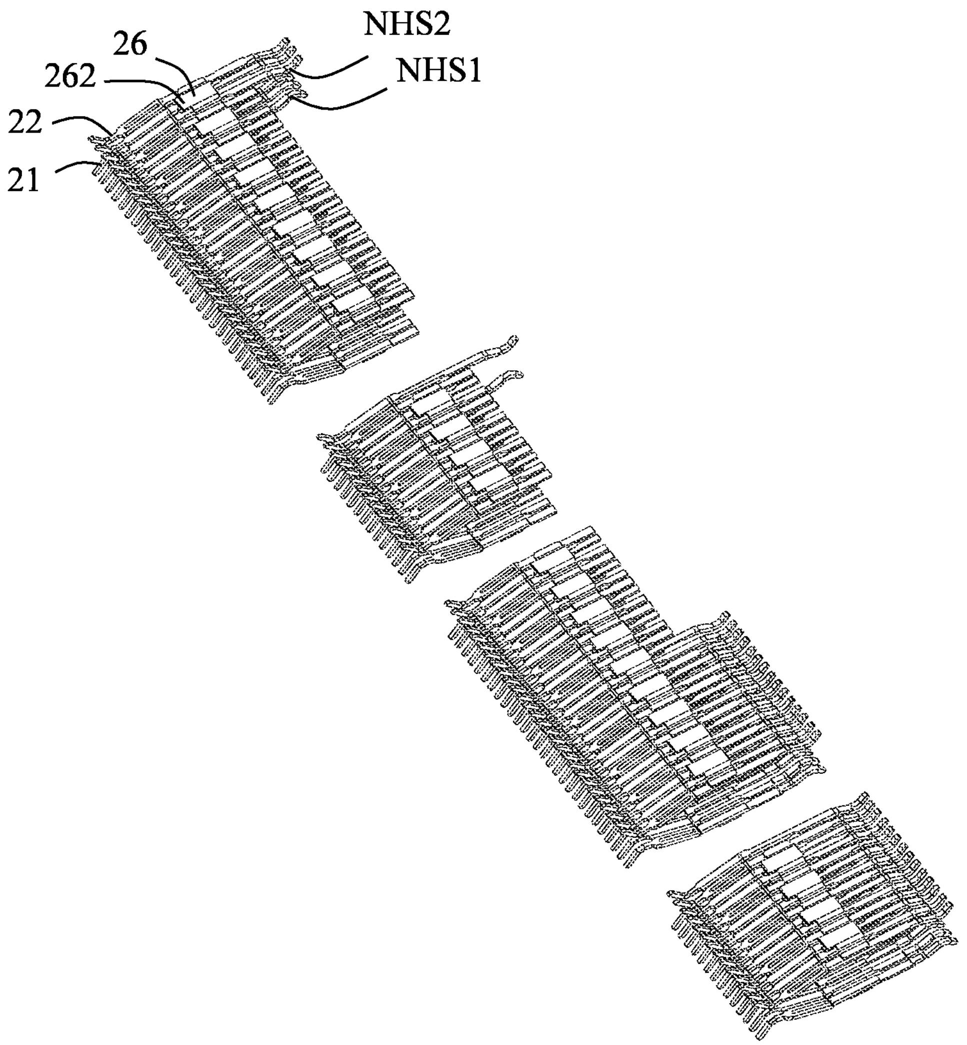
FIG. 14 is a perspective schematic view of FIG. 13 from another angle.
Figure 18:
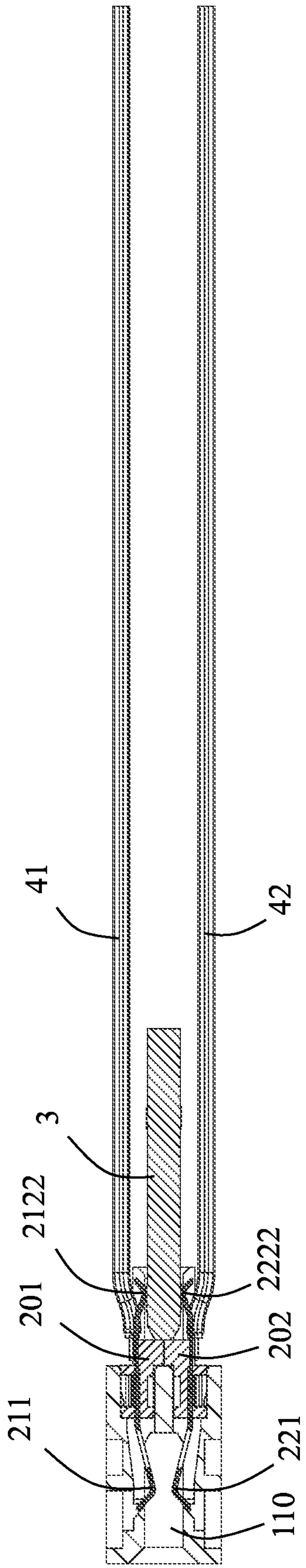
FIG. 18 is a schematic cross-sectional view taken along line E-E in FIG. 5.

Referring to FIGS. 13 and 18, each first conductive terminal 21 includes a first elastic mating portion 211 protruding into the receiving slot 110 and a first tail portion 212 opposite to the first elastic mating portion 211. The plurality of first conductive terminals 21 include a plurality of first high-speed signal terminals (High speed Signal, HS1) and a plurality of first non-high-speed signal terminals (Non-High speed Signal, NHS1). The first tail portion 212 of the first high-speed signal terminal HS1 includes a first connecting portion 2121. The first tail portion 212 of the first non-high-speed signal terminal NHS1 includes a first elastic mounting arm 2122.

Each second conductive terminal 22 includes a second elastic mating portion 221 protruding into the receiving slot 110, and a second tail portion 222 opposite to the second elastic mating portion 221. The plurality of second conductive terminals 22 include a plurality of second high-speed signal terminals (High speed Signal, HS2) and a plurality of second non-high-speed signal terminals (Non-High speed Signal, NHS2). The second tail portion 222 of the second high-speed-signal terminal HS2 includes a second connecting portion 2221. The second tail portion 222 of the second non-high-speed signal terminal NHS2 includes a second elastic mounting arm 2222. The first connecting portion 2121 has a shape of a flat plate. The first elastic mounting arm 2122 extends beyond the first connecting portion 2121 in a direction (for example, a front-to-back direction) away from the first elastic mating portion 211. The second connecting portion 2221 has a shape of a flat plate. The second elastic mounting arm 2222 extends beyond the second connecting portion 2221 in a direction (for example, the front-to-back direction) away from the second elastic mating portion 221.

In the illustrated embodiment of the present disclosure, the first elastic mating portions 211 have same structures, and the second elastic mating portions 221 also have same structures. The first elastic mating portions 211 and the second elastic mating portions 221 are symmetrically disposed on opposite sides (for example, upper and lower sides) of the receiving slot 110.

Figure 17:
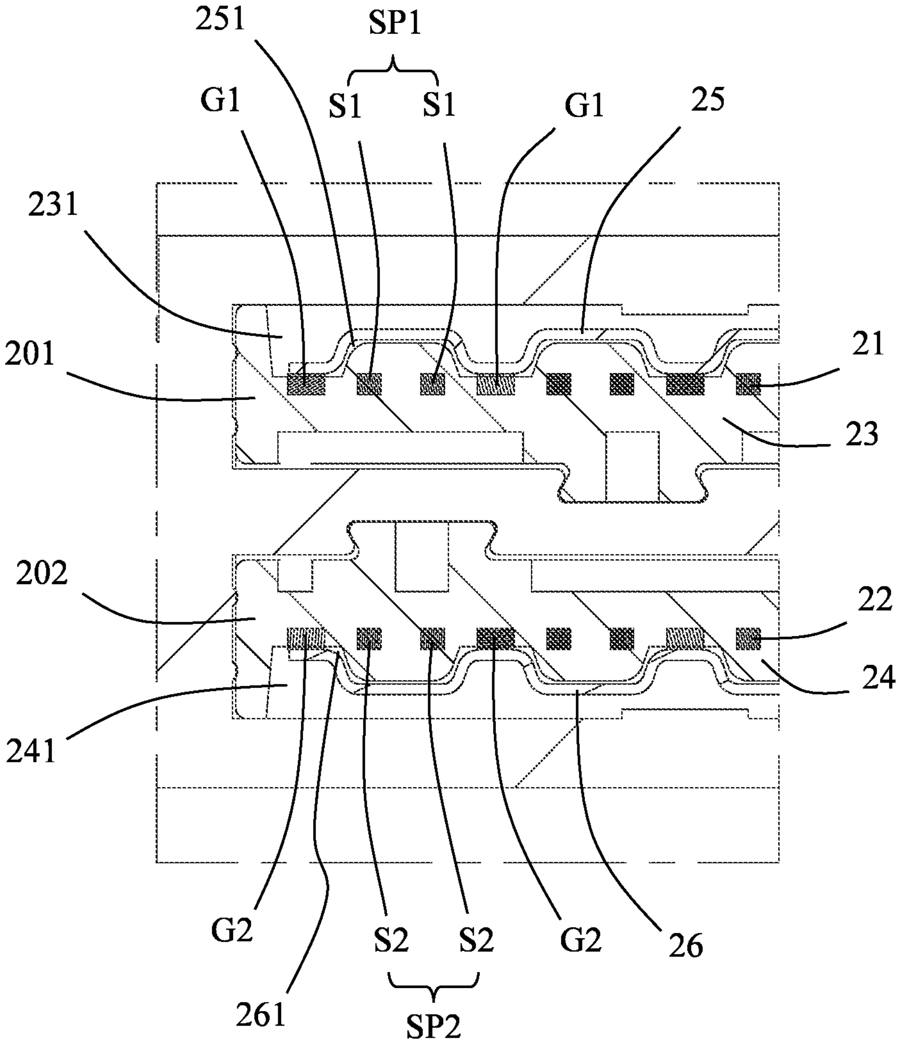
FIG. 17 is a partial enlarged view of a frame part D in FIG. 8.

Referring to FIG. 17, the plurality of first conductive terminals 21 include a plurality of first signal terminal pairs (Signal Pair, SP1) and a plurality of first ground terminals G1. The first ground terminals G1 are disposed on left and right sides of each first signal terminal pair SP1, respectively. Each first signal terminal pair SP1 includes two first signal terminals S1. The electrical connector 100 further includes a first ground connection piece 25 connecting the plurality of the first ground terminals G1 in series in order to improve the grounding shielding effect. The first ground connection piece 25 is provided with a plurality of first relief recesses 251 of which each corresponds to a corresponding first signal terminal pair SP1 to avoid short circuit due to contact with the first signal terminal pair SP1. The first conductive terminals 21 are correspondingly located in the first spacing grooves 141 to achieve positioning. The first conductive terminals 21 are at least partially exposed upwardly in the first hollow groove 140 to adjust impedance.

The plurality of second conductive terminals 22 include a plurality of second signal terminal pairs (Signal Pair, SP2) and a plurality of second ground terminals G2. The second ground terminals G2 are disposed on left and right sides of each second signal terminal pair SP2, respectively. Each second signal terminal pair SP2 includes two second signal terminals S2. The electrical connector 100 further includes a second ground connection piece 26 connecting the plurality of the second ground terminals G2 in series in order to improve the grounding shielding effect. The second ground connection piece 26 is provided with a plurality of second relief recesses 261 of which each corresponds to a corresponding second signal terminal pair SP2 to avoid short circuit due to contact with the second signal terminal pair SP2. The second conductive terminals 22 are correspondingly located in the second spacing grooves 151 to achieve positioning. The second conductive terminals 22 are at least partially exposed downwardly in the second hollow groove 150 to adjust impedance.

Figure 11:
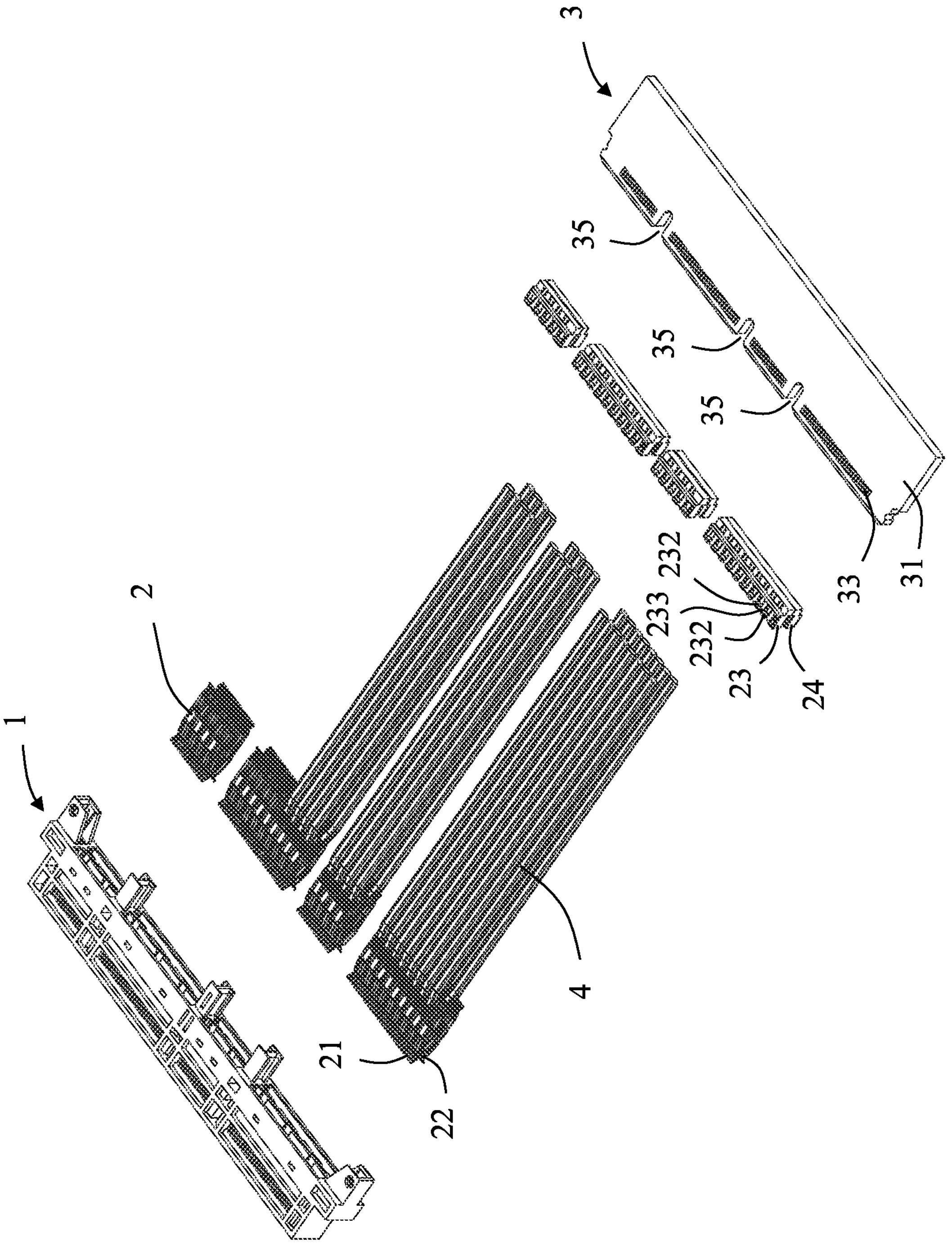
FIG. 11 is a partially exploded perspective view of FIG. 1.
Figure 12:
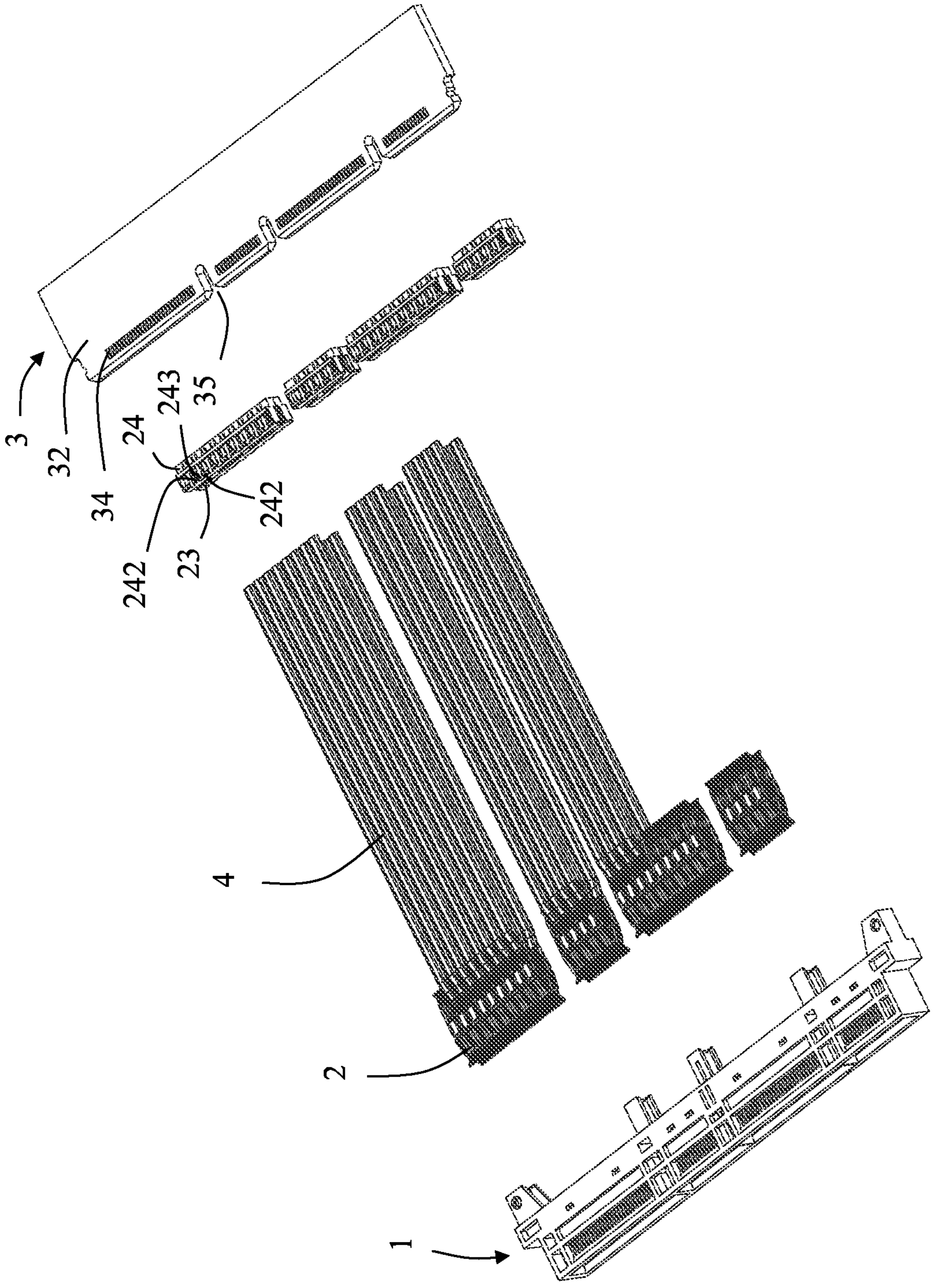
FIG. 12 is a partially exploded perspective view of FIG. 11 from another angle.

Referring to FIGS. 11, 12 and 17, the first insulating block 23 is provided with a first mounting groove 231 for mounting the first ground connection piece 25, a plurality of first protruding blocks 232, and a first positioning groove 233 located between two adjacent first protruding blocks 232. The first ground connection piece 25 includes a first protrusion 252 clamped in the first positioning groove 233.

The second insulating block 24 is provided with a second mounting groove 241 for mounting the second ground connection piece 26, a plurality of second protruding blocks 242, and a second positioning groove 243 located between two adjacent second protruding blocks 242. The second ground connection piece 26 includes a second protrusion 262 clamped in the second positioning groove 243.

Referring to FIG. 13, each first ground terminal G1 includes a first inclined arm 213 connected to the first elastic mating portion 211 of the first ground terminal G1. Each first signal terminal S1 includes a second inclined arm 214 connected to the first elastic mating portion 211 of the first signal terminal S1. A width of the first inclined arm 214 is greater than a width of the second inclined arm 214. In the illustrated embodiment of the present disclosure, the first inclined arm 213 is provided with a first slot 2131 to adjust impedance.

Similarly, each second ground terminal G2 includes a third inclined arm 223 connected to the second elastic mating portion 221 of the second ground terminal G2. Each second signal terminal S2 includes a fourth inclined arm 224 connected to the second elastic mating portion 221 of the second signal terminal S2. A width of the third inclined arm 223 is greater than a width of the fourth inclined arm 224. In the illustrated embodiment of the present disclosure, the third inclined arm 223 is provided with a second slot 2231 to adjust impedance.

Referring to FIGS. 3, 11 and 12, the adapter circuit board 3 is used to process signals and is connected to a main circuit board (not shown). The adapter circuit board 3 includes a first surface 31, a second surface 32 disposed opposite to the first surface 31, a plurality of first conductive pads 33 exposed on the first surface 31, and a plurality of second conductive pads 34 exposed on the second surface 32. In addition, the adapter circuit board 3 further includes a positioning notch 35 for mating with the partition 16. The adapter circuit board 3 is mounted to the insulating body 1 along a rear-to-front direction. The adapter circuit board 3 is at least partially inserted into the positioning slot 130. The first rib 131 abuts against the second surface 32 of the adapter circuit board 3, and the second rib 132 abuts against the first surface 31 of the adapter circuit board 3, thereby preventing the adapter circuit board 3 from being loosened.

In the illustrated embodiment of the present disclosure, the first connecting portions 2121, the second connecting portions 2221, the first elastic mounting arms 2122 and the second elastic mounting arms 2222 all extend backwardly beyond the rear end surface 12. When the adapter circuit board 3 is assembled in place, the adapter circuit board 3 is clamped between the first elastic mounting arms 2122 and the second elastic mounting arms 2222. In the illustrated embodiment of the present disclosure, both the first elastic mounting arms 2122 and the second elastic mounting arms 2222 have arc-shaped contact portions so as to facilitate insertion of the adapter circuit board 3. The first elastic mounting arms 2122 are electrically connected to the first conductive pads 33. The second elastic mounting arms 2222 are electrically connected to the second conductive pads 34. In an embodiment of the present disclosure, the first elastic mounting arms 2122 abut against the first conductive pads 33, and a soldering process may be omitted to save cost. Similarly, the second elastic mounting arms 2222 are in contact with the second conductive pads 34, and a soldering process may be omitted to save cost. Of course, in other embodiments, the first elastic mounting arms 2122 and the first conductive pads 33 may be further fixed by soldering; and the second elastic mounting arms 2222 and the second conductive pads 34 may be further fixed by soldering, thereby improving the contact reliability thereof.

Figure 15:
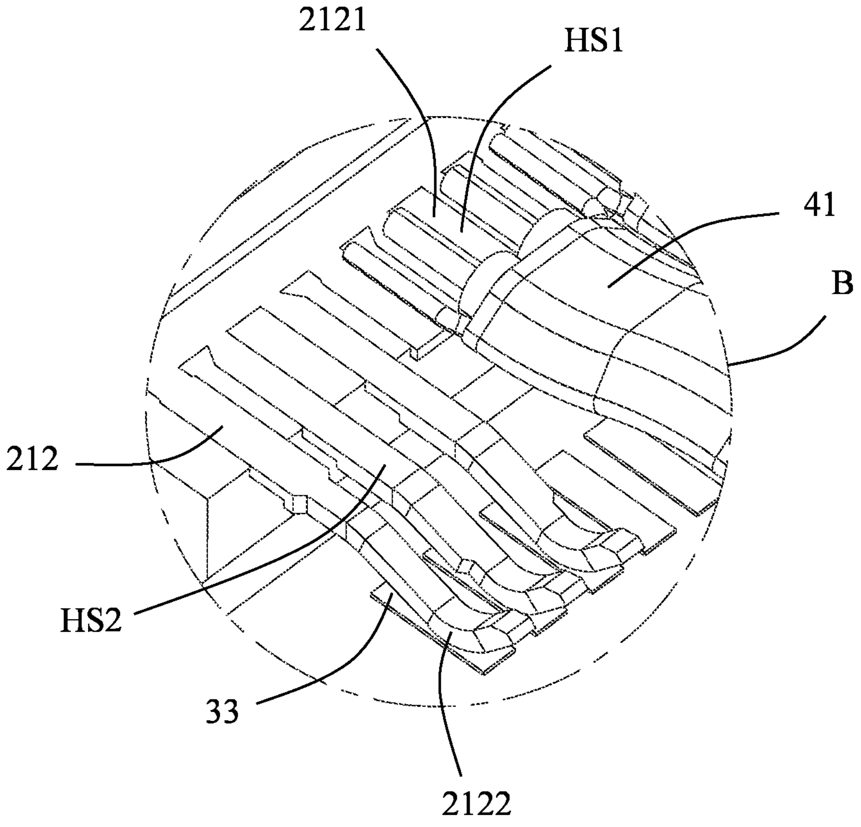
FIG. 15 is a partial enlarged view of a circled part B in FIG. 1.
Figure 16:
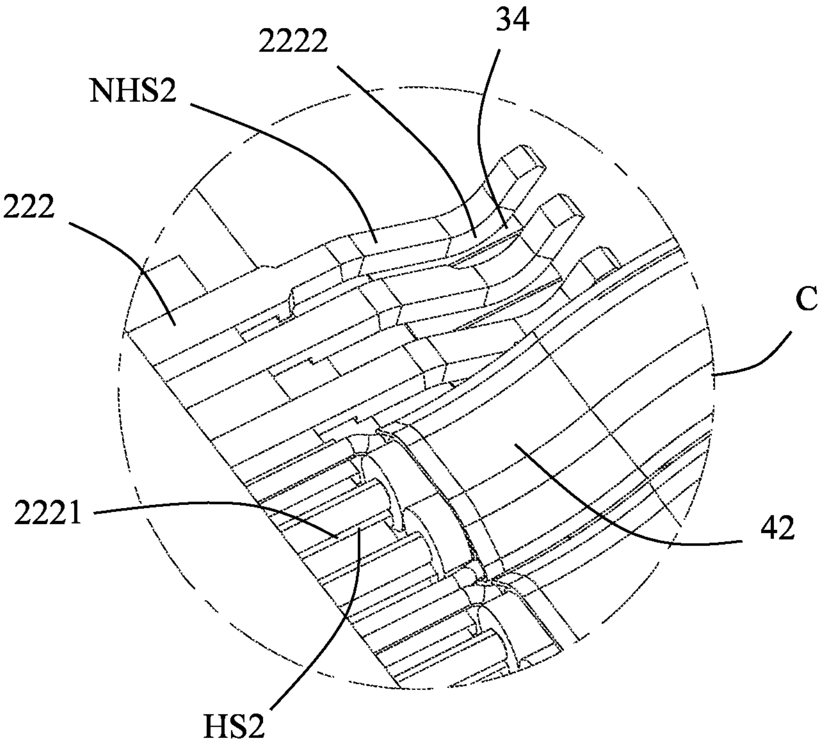
FIG. 16 is a partial enlarged view of a circled part C in FIG. 2.

Referring to FIGS. 15 and 16, the plurality of cables 4 include a plurality of first cables 41 electrically connected to the first connecting portions 2121 and a plurality of second cables 42 electrically connected to the second connecting portions 2221. The first connecting portions 2121 are fixed to the first cables 41 by soldering, and the second connecting portions 2221 are fixed to the second cables 42 by soldering.

Compared with the prior art, the first high-speed signal terminals HS1 and the second high-speed signal terminals HS2 of the present disclosure are connected to the first cables 41 and the second cables 42, and are transmitted through cables, which reduces the signal distortion that may be caused when high-speed signals are transmitted through a circuit board, thereby improving the quality of signal transmission. At the same time, the first non-high-speed signal terminals NHS1 and the second non-high-speed signal terminals NHS2 are electrically connected to the adapter circuit board 3, which simplifies the circuit design of the adapter circuit board 3. The first conductive terminals 21 and the second conductive terminals 22 of the electrical connector 100 of the present disclosure are connected by a combination of the cables and the adapter circuit board 3, which facilitates better arrangement of the conductive terminals 2. This can not only adapt to the transmission of high-speed signal terminals and non-high-speed signal terminals, but also balance the design of the electrical connector 100 and save costs.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:

an insulating body, the insulating body comprising a mating surface and a receiving slot extending through the mating surface;

a plurality of first conductive terminals, each first conductive terminal comprising a first elastic mating portion protruding into the receiving slot and a first tail portion opposite to the first elastic mating portion; the plurality of first conductive terminals comprising a plurality of first high-speed signal terminals and a plurality of first non-high-speed signal terminals, the first tail portion of each first high-speed signal terminal comprising a first connecting portion, the first tail portion of each first non-high-speed signal terminal comprising a first elastic mounting arm;

a plurality of second conductive terminals, each second conductive terminal comprising a second elastic mating portion protruding into the receiving slot and a second tail portion opposite to the second elastic mating portion; the plurality of second conductive terminals comprising a plurality of second high-speed signal terminals and a plurality of second non-high-speed signal terminals, the second tail portion of each second high-speed signal terminal comprising a second connecting portion, the second tail portion of each second non-high-speed signal terminal comprising a second elastic mounting arm; wherein the first elastic mating portions of the first conductive terminals and the second elastic mating portions of the second conductive terminals are located on opposite sides of the receiving slot, respectively;

an adapter circuit board, the adapter circuit board comprising a first surface, a second surface opposite to the first surface, a plurality of first conductive pads exposed on the first surface, and a plurality of second conductive pads exposed on the second surface; the adapter circuit board being located between the first elastic mounting arms and the second elastic mounting arms, the first elastic mounting arms being electrically connected to the first conductive pads, the second elastic mounting arms being electrically connected to the second conductive pads;

a plurality of cables, the plurality of cables comprising a plurality of first cables electrically connected to the first connecting portions and a plurality of second cables electrically connected to the second connecting portions.

2. The electrical connector according to claim 1, wherein the first elastic mating portions have same structures, the second elastic mating portions have same structures, and the first elastic mating portions and the second elastic mating portions are symmetrically located on the opposite sides of the receiving slot.

3. The electrical connector according to claim 1, wherein the first connecting portion is in a shape of a flat plate, and the first elastic mounting arm extends beyond the first connecting portion in a direction away from the first elastic mating portion;

wherein the second connecting portion is in a shape of a flat plate, and the second elastic mounting arm extends beyond the second connecting portion in a direction away from the second elastic mating portion.

4. The electrical connector according to claim 3, wherein the first connecting portions are fixed to the first cables by soldering, and the first elastic mounting arms abut against the first conductive pads; and wherein the second connecting portions are fixed to the second cables by soldering, and the second elastic mounting arms abut against the second conductive pads.

5. The electrical connector according to claim 1, wherein the insulating body comprises a top wall and a bottom wall, the receiving slot is located between the top wall and the bottom wall, the top wall defines a first hollow groove, the first conductive terminals are at least partially exposed upwardly in the first hollow groove, the bottom wall defines a second hollow groove, and the second conductive terminals are at least partially exposed downwardly in the second hollow groove.

6. The electrical connector according to claim 1, wherein the insulating body comprises a rear end surface and an extension portion extending backwardly beyond the rear end surface, the first connecting portions, the second connecting portions, the first elastic mounting arms, and the second elastic mounting arms all extend backwardly beyond the rear end face, and the extension portion is provided with a positioning groove to at least partially receive the adapter circuit board.

7. The electrical connector according to claim 6, wherein the extension portion comprises a first rib protruding upwardly into the positioning groove, and a second rib protruding downwardly into the positioning groove, the first rib abuts against the second surface of the adapter circuit board, and the second rib abuts against the first surface of the adapter circuit board.

8. The electrical connector according to claim 6, wherein a plurality of the receiving slots are provided and arranged at intervals along a length direction of the electrical connector, the insulating body comprises a partition located between two adjacent receiving slots along the length direction, the partition protrudes backwardly beyond the rear end surface, and the adapter circuit board defines a positioning notch to match with the partition.

9. The electrical connector according to claim 1, wherein the plurality of first conductive terminals comprise a plurality of first signal terminal pairs and a plurality of first ground terminals, the first ground terminals are disposed on left and right sides of each first signal terminal pair, respectively; the electrical connector further comprises a first ground connection piece connecting the plurality of the first ground terminals in series, the first ground connection piece is provided with a plurality of first relief recesses of which each corresponds to a corresponding first signal terminal pair; and wherein the plurality of second conductive terminals comprise a plurality of second signal terminal pairs and a plurality of second ground terminals, the second ground terminals are disposed on left and right sides of each second signal terminal pair, respectively; the electrical connector further comprises a second ground connection piece connecting the plurality of the second ground terminals in series, the second ground connection piece is provided with a plurality of second relief recesses of which each corresponds to a corresponding second signal terminal pair.

10. The electrical connector according to claim 9, wherein each first ground terminal comprises a first inclined arm connected to the first elastic mating portion of the first ground terminal, each first signal terminal pair comprises two first signal terminals, each first signal terminal comprises a second inclined arm connected to the first elastic mating portion of the first signal terminal, a width of the first inclined arm is greater than a width of the second inclined arm; and wherein each second ground terminal comprises a third inclined arm connected to the second elastic mating portion of the second ground terminal, each second signal terminal pair comprises two second signal terminals, each second signal terminal comprises a fourth inclined arm connected to the second elastic mating portion of the second signal terminal, and a width of the third inclined arm is greater than a width of the fourth inclined arm.

11. The electrical connector according to claim 10, wherein the first inclined arm is provided with a first slot, and the third inclined arm is provided with a second slot.

12. The electrical connector according to claim 9, further comprising a first terminal module and a second terminal module, the first terminal module comprising a first insulating block, the plurality of first conductive terminals being insert-molded with the first insulating block, the first insulating block being provided with a first installation groove for installing the first ground connection piece, the second terminal module comprising a second insulating block, the plurality of second conductive terminals being insert-molded with the second insulating block, the second insulating block being provided with a second installation groove for installing the second ground connection piece.

13. The electrical connector according to claim 12, wherein the first insulating block comprises a plurality of first protruding blocks and a first positioning groove located between two adjacent first protruding blocks, and the first ground connection piece comprises a first protrusion clamped in the first positioning groove; and wherein the second insulating block comprises a plurality of second protruding blocks and a second positioning groove located between two adjacent second protruding blocks, and the second ground connection piece comprises a second protrusion clamped in the second positioning groove.

14. The electrical connector according to claim 8, wherein two adjacent receiving slots have different sizes along the length direction of the electrical connector.

15. The electrical connector according to claim 1, wherein the first elastic mounting arms are soldered with the first conductive pads, and the second elastic mounting arms are soldered with the second conductive pads.

16. An electrical connector, comprising:

an insulating body, the insulating body comprising a mating surface and a receiving slot extending through the mating surface;

a plurality of first conductive terminals, each first conductive terminal comprising a first elastic mating portion and a first tail portion; the plurality of first conductive terminals comprising a plurality of first high-speed signal terminals and a plurality of first non-high-speed signal terminals, the first tail portion of each first high-speed signal terminal comprising a first connecting portion, the first tail portion of each first non-high-speed signal terminal comprising a first elastic mounting arm;

a plurality of second conductive terminals, each second conductive terminal comprising a second elastic mating portion and a second tail portion; the plurality of second conductive terminals comprising a plurality of second high-speed signal terminals and a plurality of second non-high-speed signal terminals, the second tail portion of each second high-speed signal terminal comprising a second connecting portion, the second tail portion of each second non-high-speed signal terminal comprising a second elastic mounting arm; wherein the first elastic mating portions of the first conductive terminals and the second elastic mating portions of the second conductive terminals are located on opposite sides of the receiving slot, respectively;

an adapter circuit board, the adapter circuit board comprising a first surface, a second surface opposite to the first surface, a plurality of first conductive pads exposed on the first surface, and a plurality of second conductive pads exposed on the second surface; the adapter circuit board being located between the first elastic mounting arms and the second elastic mounting arms, the first elastic mounting arms being soldered with the first conductive pads, the second elastic mounting arms being soldered with the second conductive pads;

a plurality of cables, the plurality of cables comprising a plurality of first cables electrically connected to the first connecting portions and a plurality of second cables electrically connected to the second connecting portions.

17. The electrical connector according to claim 16, wherein the first elastic mating portions have same structures, the second elastic mating portions have same structures, and the first elastic mating portions and the second elastic mating portions are symmetrically located on the opposite sides of the receiving slot.

18. The electrical connector according to claim 16, wherein the first connecting portion is in a shape of a flat plate, and the first elastic mounting arm extends beyond the first connecting portion in a direction away from the first elastic mating portion;

wherein the second connecting portion is in a shape of a flat plate, and the second elastic mounting arm extends beyond the second connecting portion in a direction away from the second elastic mating portion.

19. The electrical connector according to claim 16, wherein the insulating body comprises a top wall and a bottom wall, the receiving slot is located between the top wall and the bottom wall, the top wall defines a first hollow groove, the first conductive terminals are at least partially exposed upwardly in the first hollow groove, the bottom wall defines a second hollow groove, and the second conductive terminals are at least partially exposed downwardly in the second hollow groove.

20. The electrical connector according to claim 16, wherein the plurality of first conductive terminals comprise a plurality of first signal terminal pairs and a plurality of first ground terminals, the first ground terminals are disposed on left and right sides of each first signal terminal pair, respectively;

wherein the electrical connector further comprises a first ground connection piece connecting the plurality of the first ground terminals in series, and the first ground connection piece is provided with a plurality of first relief recesses of which each corresponds to a corresponding first signal terminal pair; and wherein the plurality of second conductive terminals comprise a plurality of second signal terminal pairs and a plurality of second ground terminals, the second ground terminals are disposed on left and right sides of each second signal terminal pair, respectively; the electrical connector further comprises a second ground connection piece connecting the plurality of the second ground terminals in series, the second ground connection piece is provided with a plurality of second relief recesses of which each corresponds to a corresponding second signal terminal pair.

* * * * *